United States Patent
Bauer

(10) Patent No.: US 10,050,579 B2
(45) Date of Patent: Aug. 14, 2018

(54) DAMPED BEARING OF A ROTOR SHAFT

(71) Applicant: SIEMENS AKTIENGESELLSCHAFT, München (DE)

(72) Inventor: Christian Bauer, Gnotzheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/113,353

(22) PCT Filed: Jan. 14, 2015

(86) PCT No.: PCT/EP2015/050535
§ 371 (c)(1),
(2) Date: Jul. 21, 2016

(87) PCT Pub. No.: WO2015/110322
PCT Pub. Date: Jul. 30, 2015

(65) Prior Publication Data
US 2017/0012570 A1 Jan. 12, 2017

(30) Foreign Application Priority Data
Jan. 23, 2014 (EP) .................................... 14152298

(51) Int. Cl.
*G05B 5/01* (2006.01)
*H02P 29/50* (2016.01)
(Continued)

(52) U.S. Cl.
CPC .............. *H02P 29/50* (2016.02); *F16C 27/00* (2013.01); *F16C 27/02* (2013.01); *F16C 27/04* (2013.01);
(Continued)

(58) Field of Classification Search
USPC ..... 318/460, 611, 623, 702; 310/12.31, 326, 310/156.74, 51
See application file for complete search history.

(56) References Cited

U.S. PATENT DOCUMENTS 2,062,290 A * 12/1936 Bott ........................ F16C 17/06
384/220
4,514,458 A 4/1985 Thorn
(Continued)

FOREIGN PATENT DOCUMENTS

CN 1327292 A 12/2001
CN 1651788 A 8/2005
(Continued)

*Primary Examiner* — Jorge L Carrasquillo
(74) *Attorney, Agent, or Firm* — Henry M. Feiereisen LLC

(57) ABSTRACT

The invention relates to an arrangement for the damped bearing of a rotor shaft (1) of an electric machine. The invention also relates to an electric machine comprising a rotor shaft (1) and at least one such arrangement. The invention further relates to a method for the damped bearing of a rotor shaft (1) of such an electric machine. In order to provide an alternative for the damped bearing of a rotor shaft (1), it is proposed that the arrangement has a bearing unit (2), which can be arranged between the rotor shaft (1) and a housing (3) of the electric machine, and a damping element (4), which can be arranged between the bearing unit (2) and the rotor shaft (1) or between the bearing unit (2) and the housing (3), wherein the damping element (4) comprises a mesh of metal wire (5).

21 Claims, 2 Drawing Sheets

(51) Int. Cl.

| | |
|---|---|
| *F16C 27/04* | (2006.01) |
| *H02K 5/16* | (2006.01) |
| *H02K 5/24* | (2006.01) |
| *H02K 11/20* | (2016.01) |
| *F16C 27/00* | (2006.01) |
| *F16C 27/02* | (2006.01) |
| *H02K 7/08* | (2006.01) |

(52) U.S. Cl.
CPC ............... *H02K 5/16* (2013.01); *H02K 5/161* (2013.01); *H02K 5/24* (2013.01); *H02K 7/08* (2013.01); *H02K 11/20* (2016.01); *F16C 2380/26* (2013.01); *H02K 2213/09* (2013.01)

(56) References Cited

U.S. PATENT DOCUMENTS 5,763,859 A * 6/1998 Wirz .................... D02J 13/005
    219/469
2002/0139603 A1* 10/2002 Aiken .................... B60K 17/24
    180/381

FOREIGN PATENT DOCUMENTS

| CN | 101413541 A | 4/2009 | |
|---|---|---|---|
| DE | 19701178 A1 | 7/1998 | |
| DE | 102006026123 B3 | 1/2008 | |
| DE | 102006058172 A1 * | 6/2008 | ............. F16C 27/04 |
| DE | 202010004482 U1 | 10/2010 | |
| GB | 2269864 A * | 2/1994 | ............ F16C 27/066 |

* cited by examiner

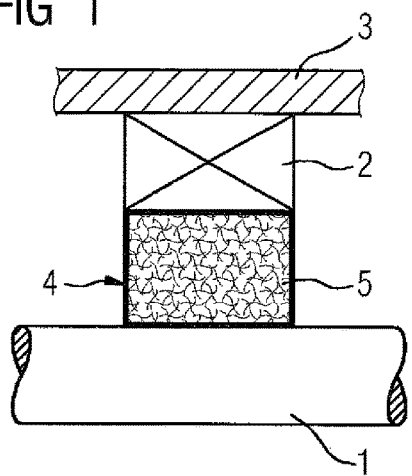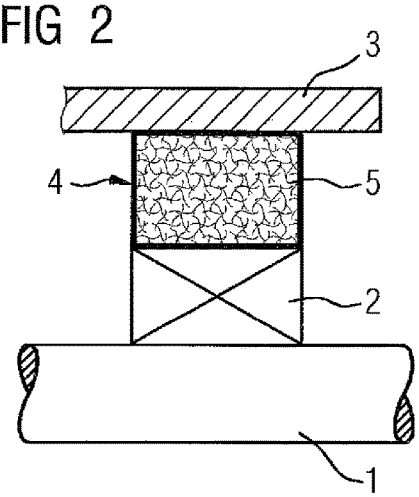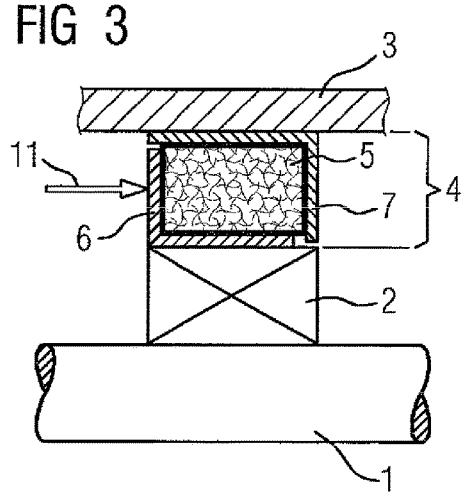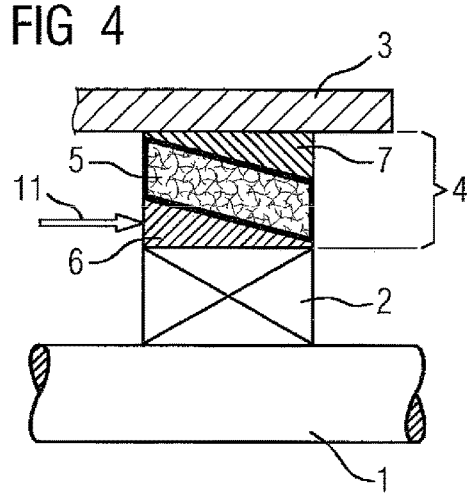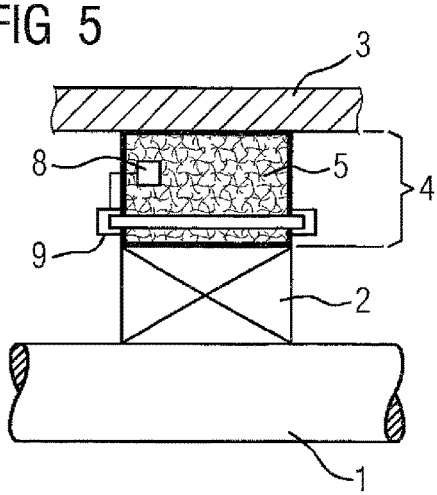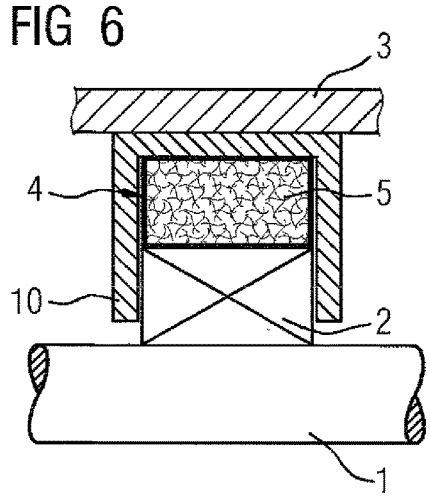

DAMPED BEARING OF A ROTOR SHAFT

CROSS-REFERENCES TO RELATED APPLICATIONS

This application is the U.S. National Stage of International Application No. PCT/EP2015/050535, filed Jan. 14, 2015, which designated the United States and has been published as International Publication No. WO 2015/110322 and which claims the priority of European Patent Application, Serial No. 14152298.7, filed Jan. 23, 2014, pursuant to 35 U.S.C. 119(a)-(d).

BACKGROUND OF THE INVENTION

The invention relates to an arrangement for the damped bearing of a rotor shaft of an electric machine. The invention further relates to an electric machine comprising a rotor shaft and at least one such arrangement. The invention also relates to a method for the damped bearing of a rotor shaft of such an electric machine.

Such arrangements and such a method are used, for example, in electric motors or generators. If any type of rotor is mounted in a rotatable manner, depending on the type of bearing, natural frequencies are produced with the associated natural mode shapes. Rotor bearings may be designed, for example, as hydrodynamic plain bearings, hydrostatic plain bearings, rolling bearings, active and passive magnetic bearings or air bearings.

Here, a differentiation is made between subcritical rotors and supercritical rotors. If the principal natural frequency of the system is above its operating speed, then this is called a subcritical rotor. If the natural frequencies are below the operating speed, this is a supercritical rotor. In this case, a specific degree of external damping is required at the bearing points in order to be able to pass through the natural frequencies up to the operating speed or in order to be able to operate the rotor at its natural frequency. Moreover, it is possible that an instability of the rotor system occurs as a result of internal damping of the rotor or due to the carrier medium of plain bearings. In order to prevent this, external damping at the bearing points is also required.

In a rotor bearing with only a very small degree of external damping at the bearing points, it is not possible to operate the rotor supercritically. A type of bearing which only generates a small degree of damping is implemented, for example, a rolling bearing. In plain bearings, damping may be produced by the carrier medium. Frequently, however, this is not sufficiently high in order to operate the rotor in one of its natural frequencies and in order to be able to avoid instabilities in any rotational speed range. Passive magnetic bearings and air bearings also have only very low damping properties. In active magnetic bearings the rotor system is kept stable by external magnetic forces and damping of the bearing is produced.

If the damping at the bearing points is insufficient there are different options for producing additional damping, for example rubber elements below the bearing or squeeze film dampers below the bearing or directly on the rotor.

A bearing ring is disclosed in DE 197 01 178 A1 which has an inner bearing shell and an outer bearing shell which are arranged at a radial distance from one another, and an element which connects together the two bearing shells fixedly in terms of rotation and which is designed as a knitted wire fabric is arranged in the intermediate space thus formed within said bearing shells.

A rolling bearing having a very similar construction is disclosed in DE 10 2006 058 172 A1.

An axial rolling bearing which comprises an upper ring, a lower ring and balls between the rings is disclosed in DE 20 2010 004 482 U1, wherein a pressed strip made of metal fibers is used for the rings and wherein the rings are overmolded with plastic shells.

SUMMARY OF THE INVENTION

The object of the invention is to provide an alternative to the damped bearing of a rotor shaft.

This object is achieved by an arrangement of the type mentioned in the introduction in that the arrangement comprises a bearing unit which can be arranged between the rotor shaft and a housing of the electric machine and a damping element which can be arranged between the bearing unit and the rotor shaft or between the bearing unit and the housing, wherein the damping element comprises a mesh of metal wire.

This object is further achieved by an electric machine of the type mentioned in the introduction, in that the electric machine comprises at least one such arrangement.

Preferably it is provided here that the bearing unit is arranged between the rotor shaft and the housing of the electric machine and the damping element is arranged between the bearing unit and the rotor shaft or between the bearing unit and the housing.

This object is further achieved by a method for the damped bearing of a rotor shaft of such an electric machine, in that the respective arrangement comprises a bearing unit which is arranged between the rotor shaft and a housing of the electric machine and a damping element which is arranged between the bearing unit and the rotor shaft or between the bearing unit and the housing, wherein the damping element comprises a mesh of metal wire, wherein the respective arrangement comprises a sensor element and a force element operatively connected to the sensor element, comprising the method steps:

- detecting a spring constant of the damping element, a damping constant of the damping element and/or a pretensioning force acting on the damping element by means of the sensor element,
- controllable pretensioning of the damping element by means of the force element such that the rotor shaft and/or the electric machine is able to be operated supercritically or such that the natural frequencies of the rotor shaft mounted in a damped manner are higher than an operating frequency of the electric machine.

The damping element may be produced, for example, from pressed metal wire and, in particular, is attached around the bearing point so that the damping element is arranged radially outward on the bearing unit and encloses the bearing unit. Thus, from the radially inward to the radially outward direction, firstly the rotor shaft is arranged, then the bearing unit, subsequently the damping element and finally the housing of the electric machine.

Alternatively, the damping element may be arranged radially outwardly on the rotor shaft and enclose the rotor shaft. Correspondingly, from the radially inward to radially outward direction, firstly the rotor shaft is arranged, then the damping element, subsequently the bearing unit and finally the housing of the electric machine. As a result, the bearing unit which provides the degree of rotational freedom for the rotor shaft encloses the damping element so that the actual bearing point is located on the outer face of the damping element.

An additional high-level damping action is introduced into the system of the mounted rotor shaft by the damping element. When the rotor shaft vibrates relative to the housing the damping is produced by the friction produced in the wire coils, wherein the damping acts as external damping.

In principle, two such damping elements may also be provided, the bearing unit being arranged between said two damping elements. This embodiment permits a particularly high degree of damping to be applied to the system of the rotor shaft mounted in a damped manner.

The proposed solution, as described above, may be used for the damped bearing of radial forces. The damped bearing of axial forces may also be provided by the proposed solution, by the damping element and the bearing unit being arranged in the axial direction between the rotor shaft and/or a part of the rotor shaft and the housing. Additionally, mixed types are also possible, by means of which a superposition of radial forces and axial forces are received in a damped manner.

The operative connection of the force element to the sensor element may be implemented, for example, by a direct data exchange by means of a wire connection or a wireless connection between the sensor element and the force element. It is also conceivable for the operative connection to be designed to be indirect, for example by data from the sensor element eventually causing a specific action of the force element via the computer unit and the converter unit.

The proposed method for the damped bearing of the rotor shaft provides that the spring constant of the damping element, the damping constant of the damping element and/or the pretensioning force acting on the damping element is detected, wherein to this end the sensor element is used. Moreover, it is provided that the damping element is able to be pretensioned in a controllable manner, wherein the force element and, for example, a computing unit may be used to this end.

In principle, the pretensioning force may be embodied as compressive force or tensile force. In particular, if two or more force elements are provided, a combination of different compressive forces or tensile forces may also be implemented which, in particular, act in different directions on the damping element and/or act at different points on the damping element. An anisotropy of the damping properties may thus be achieved, whereby vibrational modes acting in different directions may be damped to different degrees.

In the proposed method for operating an electric machine and the corresponding arrangement, in particular at a supercritical operation, it is provided that the natural frequencies of the rotor shaft and/or the electric machine are passed through as rapidly as possible. Accordingly, when the electric machine is accelerated a positive chronological change to the rotational speed takes place and when the electric machine is decelerated a negative chronological change to the rotational speed takes place. In this case, the greatest possible chronological change to the rotational speed, in particular, is that which is able to be implemented permanently in terms of technology both by the converter unit and by the electric machine without damage to the equipment or excessive ageing and/or excessive wear of the equipment occurring at the same time.

In particular, it may be provided that the sensor element applies test impulses for determining the natural frequencies and determines the response of the system to the test impulses. The converter unit, in particular, is provided for supplying the stator of the electric machine with electrical energy and acts upon the stator according to inputs from the computing unit. The computing unit may be designed, for example, as a microcontroller, CPU or the like and, in particular, integrated in the sensor element, the force element or the converter unit. Alternatively, the computing unit may be integrated in a superordinate controller or the converter unit.

In one advantageous embodiment of the invention, the bearing unit is configured as a rolling bearing or as a plain bearing.

Rolling bearings generally have no inherent damping or only a very low level of inherent damping. The additional external damping of the proposed arrangement permits a rotor system to be operated supercritically even if such types of bearing which only generate very little inherent damping are used. This permits, for example, the bearing of a relatively powerful electrical motor to be provided with an axle height of 450 mm or more, by means of the proposed arrangement with a rolling bearing. Such large and powerful electric machines are generally operated supercritically so that the operating speed is greater than at least one natural frequency of the electric machine. Here, the use of a rolling bearing has many advantages such as, for example, relatively simple mounting and maintenance. In this case, the damping element more than compensates for the drawback of the very low level of damping of the rolling bearing, so that thanks to the proposed arrangement large electric machines may be operated supercritically even with a rolling bearing.

Plain bearings in turn may generate external damping so that the use of a plain bearing in the proposed arrangement permits the damping of the entire system to be further increased. As a result, the rotor shaft may be operated in or above one of its natural frequencies, since the response amplitudes of any excitation remain low as a result of the high level of damping and an instability of the system is prevented. Thus supercritical rotors are possible with a practically unlimited rotational speed adjustment range.

In a further advantageous embodiment of the invention, the damping element comprises an inner ring and an outer ring, wherein the mesh of metal wire is arranged between the inner ring and the outer ring.

The mesh of metal wire is securely gripped and fixed in its position by the inner ring and the outer ring. Moreover, particularly simple maintenance is permitted thereby, since a worn metal mesh is able to be easily replaced. This is achieved, for example, by only one of the rings having to be removed in order to replace the metal mesh and subsequently to reattach the removed ring.

Moreover, the two rings may also be used for pretensioning the damping element by a force being exerted in the one axial direction on one of the rings and a force being exerted in the opposing axial direction on the other ring, for example.

In a further advantageous embodiment of the invention, the inner ring and/or the outer ring in this case has an L-shaped cross section.

By means of the L-shaped cross section the metal mesh may be easily protected from negative external influences, such as for example dust and other contaminants. In particular, if both the inner ring and the outer ring have an L-shaped cross section and the two L-shaped cross sections are arranged such that a rectangular cross section is formed, a particularly reliable protection of the metal mesh is able to be achieved. Moreover, by a corresponding arrangement, the shorter web of the L-shaped cross section may serve to fix the metal mesh in the axial direction, whereby a reliable adjustment of a pretensioning force of the damping element is permitted.

In an alternative advantageous embodiment of the invention, the inner ring and/or the outer ring has a wedge-shaped cross section.

Due to the wedge-shaped cross section a pretensioning force acting in the axial direction on the damping element may be used to exert a modified pretensioning force on the bearing unit and/or the rotor shaft, which has a component both in the axial direction and in the radial direction. In particular, this may be advantageous in electric machines, in which forces acting in the axial and radial directions may be reliably borne and vibrations present in corresponding directions may be reliably damped.

In principle, in this case it is also conceivable that one of the two rings has an L-shaped cross section and the other ring has a wedge-shaped cross section.

In a further advantageous embodiment of the invention, the damping element has a spring constant and a damping constant, wherein the damping element is able to be pretensioned such that the damping element has a predeterminable spring constant and/or a predeterminable damping constant.

The stiffness of the damping element depends, amongst other things, on the pretensioning force applied to the metal mesh. The stiffness of the damping element may be adjusted via this force. In particular, the predeterminable spring constant and/or the predeterminable damping constant may be determined beforehand, for example by corresponding calculations or tests being carried out. Preferably, the predeterminable spring constant and/or the predeterminable damping constant may be selected such that the natural frequencies of the rotor shaft or the electric machine are shifted up to higher frequencies. By exerting a pretensioning force which results in a spring constant corresponding to the predeterminable spring constant and/or which results in a damping constant corresponding to the predeterminable damping constant, the rotor shaft may, in particular, always be operated subcritically, whereby the stability of the rotor shaft and/or the electric machine is increased.

In particular, the damping element may also be designed so as to be able to be pretensioned such that the entire arrangement for the damped bearing has a predeterminable spring constant and/or a predeterminable damping constant.

In a further advantageous embodiment of the invention, in this case a sensor element is provided, the spring constant of the damping element, the damping constant of the damping element and/or the pretensioning force acting on the damping element being able to be detected thereby, wherein a force element is provided, said force element being operatively connected to the sensor element and the damping element being able to be pretensioned thereby in a controllable manner.

By the use of the sensor element and the force element, the system vibrations may be controlled so that the natural frequencies may be shifted away from the operating frequency in a targeted manner. To this end, the sensor element initially detects at least one input variable which, for example, is the damping constant of the damping element. The input variable is compared with a set variable, for example of the predeterminable damping constant, wherein the comparison may be undertaken, in particular, by the aforementioned computing unit. Based on this comparison, the force element is acted upon, in particular by means of a converter unit connected to the computing unit, such that the damping element has the desired set variable. In particular, to this end the computing unit may determine the variable of a pretensioning force which the force unit has to exert on the damping element so that the desired set variable is achieved.

It is advantageous in this case, in particular, that no tests or calculations have to be previously carried out and the arrangement also permits a reliable control of the system vibrations in changed boundary conditions. Thus, in particular, it is possible to compensate for changes to the spring constant and/or the damping constant of the damping element which may be produced, in particular, by temperature fluctuations or ageing.

In particular, the sensor element may be embodied such that the spring constant of the entire arrangement, the damping constant of the entire arrangement for the damped bearing and/or the pretensioning force acting on the entire arrangement for the damped bearing is detectable.

For example, the force element has at least one pin which is passed through the damping element and/or the mesh of metal wire, wherein a device is provided at the two axial ends of the respective pin, a compressive force or tensile force being able to be exerted on the damping element and/or the mesh of metal wire.

The sensor element and the force element in this case are connected, in particular, via the computing unit and the converter unit, as in the aforementioned method for operating the electric machine. Optionally, a direct connection of the sensor element to the force element may also be provided.

In an alternative advantageous embodiment of the invention, the damping element is able to be pretensioned such that the rotor shaft and/or the electric machine is able to be operated supercritically.

In particular, in a supercritical operation of the rotor shaft and/or the electric machine the damping element is pretensioned such that the damping constant of the damping element is sufficiently high for continuously safe operation. This may be achieved, for example, by the damping element having at least one corresponding predeterminable damping constant.

The pretensioning force may be selected, for example, such that the natural frequencies which are closest to the operating frequency of the rotor shaft and/or the electric machine are sufficiently far away from the operating frequency. In particular, to this end a natural frequency which is only slightly below the operating frequency may be shifted down, provided that the damping, by means of the damping element which is present when passing through this natural frequency, may be configured to be at a sufficiently high level, at least temporarily.

In a further advantageous embodiment of the invention, the damping element is able to be pretensioned such that the natural frequencies of the rotor shaft mounted in a damped manner are higher than an operating frequency of the electric machine.

By means of a damping element pretensioned in such a manner, the rotor shaft and/or the electric machine may be reliably operated subcritically, whereby the stability of the system and, in particular, the service life of the bearing unit are increased.

In a further advantageous embodiment of the invention, the arrangement comprises a shield element which is able to be arranged between the rotor shaft and the housing, wherein the bearing unit and the damping element are able to be arranged between the rotor shaft and the shield element or between the housing and the shield element.

The shield element may be designed, in particular, such that it at least partially encloses the bearing unit and the damping element. Thus the entire arrangement for the damped bearing may form a structural unit which as a whole may be mounted, maintained and replaced in a very simple manner.

For example, the shield element may be designed to be annular, and have an L-shaped or U-shaped cross section and in this case be arranged such that the unit consisting of the bearing unit and the damping element is clamped in the radial direction to the housing or the rotor shaft by the shield element. Moreover, with such a cross section of the shield element an axial clamping in one direction and/or in both directions may be achieved, whereby, on the one hand, the stability of the entire arrangement for the damped bearing is increased and, on the other hand, the mounting and maintenance of the entire arrangement is facilitated.

Advantageously, in this case the shield element does not come into contact simultaneously with the housing and the rotor shaft. Preferably, the shield element is arranged between the rotor shaft and the housing, wherein the bearing unit and the damping element are arranged between the rotor shaft and the shield element or between the housing and the shield element.

In a further advantageous embodiment of the invention, the electric machine comprises a stator and a rotor having a rotor shaft, wherein the arrangement comprises a computing unit and a converter unit, wherein the computing unit is able to be connected to the converter unit and the converter unit is able to be connected to the stator of the electric machine, wherein the bearing unit is arranged between the rotor shaft and the housing of the electric machine and the damping element is arranged between the bearing unit and the rotor shaft or between the bearing unit and the housing, wherein the respective arrangement comprises a sensor element and a force element operatively connected to the sensor element, wherein the natural frequencies of the rotor shaft and/or the electric machine mounted in a damped manner are able to be detected by means of the sensor element, wherein the natural frequencies are able to be transmitted from the sensor element to the computing unit, wherein set values for the force element are able to be determined by the computing unit, wherein the set values are able to be transmitted from the computing unit to the converter unit, wherein the force element is able to be acted upon by the converter unit according to the set values such that the damping element is able to be acted upon by means of the force element such that the rotor shaft and/or the electric machine is able to be operated supercritically or such that the natural frequencies of the rotor shaft mounted in a damped manner are higher than an operating frequency of the electric machine, wherein if the rotor shaft and/or the electric machine is able to be operated supercritically, it is possible to pass through the natural frequencies with the greatest possible chronological change to the rotational speed until the operating frequency or a standstill is reached.

In a further advantageous embodiment of the invention, according to the proposed method it is provided that the electric machine comprises a stator and a rotor having a rotor shaft, wherein a computing unit and a converter unit are provided, wherein the computing unit is connected to the converter unit and the converter unit is connected to the stator of the electric machine, wherein the following method steps are further provided:

determining the natural frequencies of the rotor shaft and/or the electric machine mounted in a damped manner, by means of the sensor element, transmitting the natural frequencies from the sensor element to the computing unit, determining set values for the force element by the computing unit, transmitting the set values from the computing unit to the converter unit, acting upon the force element by means of the converter unit according to the set values such that the damping element is acted upon by means of the force element such that the rotor shaft and/or the electric machine is able to be operated supercritically or such that the natural frequencies of the rotor shaft mounted in a damped manner are higher than an operating frequency of the electric machine, if the rotor shaft and/or the electric machine is operated supercritically: passing through the natural frequencies with the greatest possible chronological change to the rotational speed until the operating frequency or a standstill is reached.

For example, an electric machine in the arrangement proposed above for the damped bearing of a rotor shaft may have an axle height of at least 350 mm, in particular greater than 450 mm. The arrangement may be used in electric machines which are able to be operated at an electrical power of at least 250 kW, in particular more than 1 MW.

BRIEF DESCRIPTION OF THE DRAWING

The invention is described and explained hereinafter in more detail with reference to the exemplary embodiments shown in the figures, in which:

FIGS. 1-7 show a first to seventh exemplary embodiment of the arrangement according to the invention for the damped bearing of a rotor shaft of an electric machine.

FIG. 1 shows a first exemplary embodiment of the arrangement according to the invention for the damped bearing of a rotor shaft 1 of an electric machine.

DETAILED DESCRIPTION OF PREFERRED EMBODIMENTS

Figure 7:
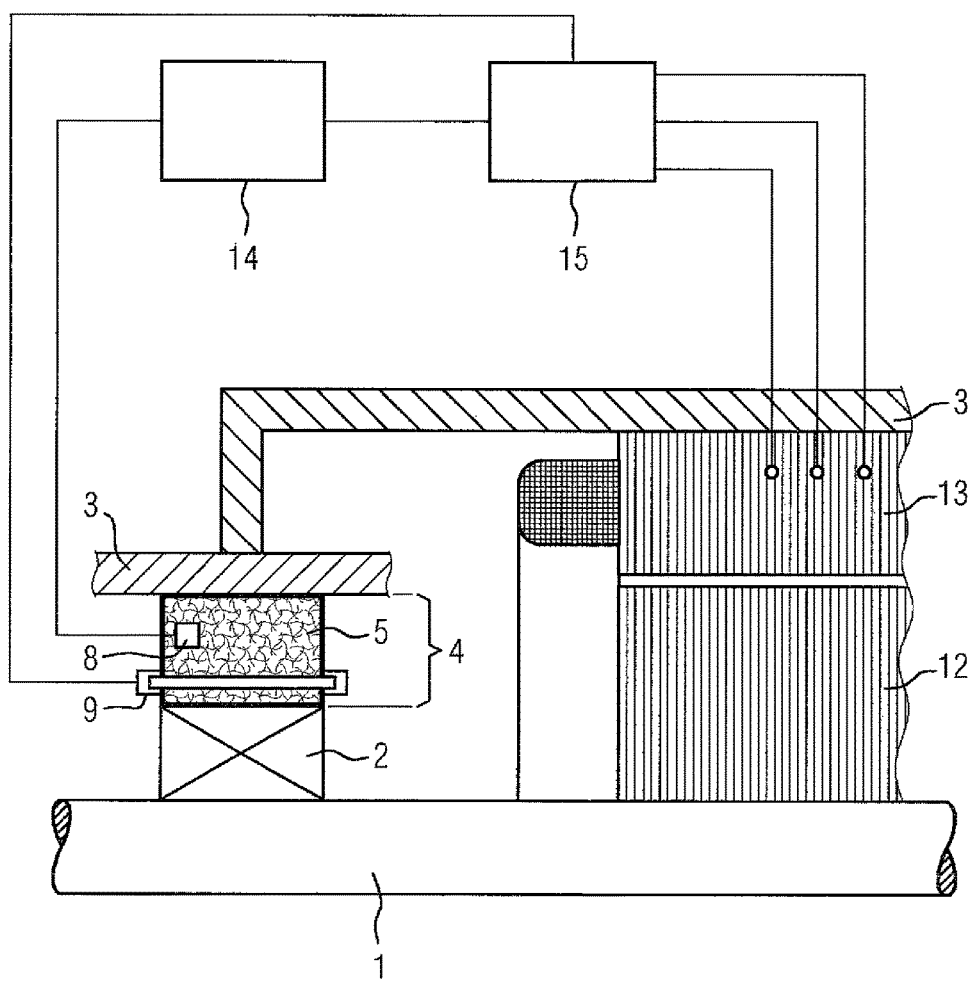

The arrangement is arranged between the housing 3 of an electric machine and the rotor shaft 1 of the electric machine and has a bearing unit 2 and a damping element 4. In this case the damping element 4 comprises a mesh of metal wire 5. According to the first exemplary embodiment, in this case the damping element 4 is arranged radially further inward than the bearing element 2. The bearing unit 2 may be designed, for example, as a rolling bearing or as a plain bearing.

FIG. 2 shows a second exemplary embodiment of the arrangement according to the invention.

The same reference numerals as in FIG. 1 denote the same objects here. In a modification of the first exemplary embodiment, the arrangement for the damped bearing is designed such that the bearing element 2 is arranged radially further inward than the damping element 4.

FIG. 3 shows a third exemplary embodiment of the arrangement according to the invention.

The arrangement for the damped bearing according to the third exemplary embodiment is similar to that of the second exemplary embodiment, wherein the damping element 4 has an inner ring 6 and an outer ring 7. The mesh of metal wire 5 of the damping element 4 is arranged between the inner ring 6 and the outer ring 7. The two rings 6 and 7 respectively have in this case an L-shaped cross section and when viewed in cross section, in particular, together form an approximately rectangular housing for the mesh of metal wire 5.

For example, a pretensioning force may be applied in the axial direction on the inner ring 6 as indicated by the arrow with the reference numeral 11.

Such a clamping of the mesh of metal wire 5 by means of the inner ring 6 and the outer ring 7 may also be provided in the arrangement for the damped bearing according to the first exemplary embodiment.

FIG. 4 shows a fourth exemplary embodiment of the arrangement according to the invention. In a modification of the third exemplary embodiment, the inner ring 6 and the outer ring 7 in each case have a wedge-shaped cross section. Here, the wedge of the inner ring 6 tapers in an axial direction whilst the wedge of the outer ring 7 tapers in the other axial direction. The mesh of metal wire 5 is also arranged between the two rings 6 and 7.

For example, a pretensioning force in the axial direction may be applied to the inner ring 6, as indicated by the arrow with the reference numeral 11.

Such a clamping of the mesh of metal wire 5 using the inner ring 6 and the outer ring 7 may also be provided in the arrangement for the damped bearing according to the first exemplary embodiment.

FIG. 5 shows a fifth exemplary embodiment of the arrangement according to the invention.

The arrangement for the damped bearing according to the fifth exemplary embodiment is similar to that of the second exemplary embodiment, wherein additionally a sensor element 8 and a force element 9 are provided. A spring constant of the damping element 4, a damping constant of the damping element 4 and/or a pretensioning force acting on the damping element 4 may be detected by means of the sensor element 8. In particular, to this end the sensor element 8 is arranged in the damping element 4 and/or on the mesh of metal wire 5.

The sensor element 8 is operatively connected to the force element 9, the damping element 4 being able to be pretensioned thereby in a controllable manner. For example, the force element 9 comprises at least one pin which is passed through the damping element 4 and/or the mesh of metal wire 5, wherein a device is provided at both axial ends of the respective pin, a compressive force or tensile force being able to be exerted thereby on the damping element 4 and/or the mesh of metal wire 5.

The controllable pretensioning of the damping element 4 by means of the force element 9 is implemented, in particular, by the sensor element 8 detecting at least one input variable which, for example, is the damping constant of the damping element 8. The input variable is compared with a set variable, for example a predetermined damping constant, wherein the comparison may be undertaken, in particular, by a computing unit of a controller. Based on this comparison, the force element 9 is acted upon such that the damping element 4 has the desired set value. In particular, to this end the computing unit may determine the variable of a pretensioning force which the force unit 9 has to exert on the damping element 4 so that the desired set variable is reached.

This controllable pretensioning of the damping element 4 may be used, in particular, in the arrangements for the damped bearing according to the first, the third or the fourth exemplary embodiment.

FIG. 6 shows a sixth exemplary embodiment of the arrangement according to the invention.

The arrangement for the damped bearing according to the sixth exemplary embodiment is similar to that of the second exemplary embodiment, wherein additionally a shield element 10 which is arranged between the rotor shaft 1 and the housing 3 is provided. In this case, the bearing unit 2 and the damping element 4 are arranged between the rotor shaft 1 and the shield element 10.

The shield element 10 has a U-shaped cross section, wherein the opening of the U-shape as in the present exemplary embodiment may be oriented toward the rotor shaft. In this case, the damping element 4 and the bearing unit 2 may be arranged at least partially inside the U-shape, so that the shield element 10 partially encloses the damping element 4 and the bearing unit 2.

Alternatively, the bearing unit 2 and the damping element 4 may be arranged between the housing 3 and the shield element 10. If the shield element 10 has a U-shaped cross section, the opening of the U-shape may be oriented toward the housing.

Advantageously, the shield element 10 does not come into contact simultaneously with the housing 3 and the rotor shaft 1.

The shield element 10 may also be used, in particular, in the arrangements for the damped bearing according to the first, the third, the fourth or the fifth exemplary embodiment.

FIG. 7 shows a seventh exemplary embodiment of the arrangement according to the invention.

The arrangement for the damped bearing according to the seventh exemplary embodiment comprises an arrangement for the damped bearing of the rotor shaft 1 which is similar to that of the fifth exemplary embodiment. Moreover, the arrangement comprises a computing unit 14 and a converter unit 15 connected to the computing unit 14. The electric machine has a rotor 12 which is connected fixedly in terms of rotation to the rotor shaft 1 and a stator 13 which is able to be supplied with electrical current by the converter unit 15.

By means of the sensor element 8 the natural frequencies of the rotor shaft 1 and/or the electric machine mounted in a damped manner may be determined, wherein the natural frequencies may be transmitted, from the sensor element 8 to the computing unit 14 connected to the sensor element 8. The computing unit 14 is designed to determine set values for the force element 9 and to transmit said values to the converter unit 15. The force element 9 is able to be acted upon by the converter unit 15 according to the set values, such that the rotor shaft 1 and/or the electric machine is able to be operated supercritically or such that the natural frequencies of the rotor shaft 1 mounted in a damped manner are higher than an operating frequency of the electric machine. If the rotor shaft 1 and/or the electric machine is able to be operated supercritically, the natural frequencies in this case are able to be passed through with the greatest possible chronological change of the rotational speed until the operating frequency or a standstill is reached.

The arrangement for the damped bearing according to the fifth exemplary embodiment is similar to that of the second exemplary embodiment, wherein in summary, the invention relates to an arrangement for the damped bearing of a rotor shaft of an electric machine. The invention further relates to an electric machine comprising a rotor shaft and at least one such arrangement. The invention further relates to a method for the damped bearing of a rotor shaft of such an electric machine.

In order to provide an alternative to the damped bearing of a rotor shaft, it is proposed that the arrangement has a bearing unit which is arranged between the rotor shaft and a housing of the electric machine and a damping element which is arranged between the bearing unit and the rotor shaft or between the bearing unit and the housing, wherein the damping element comprises a mesh of metal wire.

Moreover, for achieving this object it is proposed that the electric machine has at least one such arrangement.

Moreover, for achieving this object a method is proposed for the damped bearing of a rotor shaft of such an electric machine, wherein the respective arrangement has a bearing unit which is arranged between the rotor shaft and a housing of the electric machine, and a damping element which is arranged between the bearing unit and the rotor shaft or between the bearing unit and the housing, wherein the damping element has a mesh of metal wire, wherein the respective arrangement has a sensor element and a force element operatively connected to the sensor element, comprising the method steps:
- detecting a spring constant of the damping element, a damping constant of the damping element and/or a pretensioning force acting on the damping element by means of the sensor element,
- controllable pretensioning of the damping element by means of the force element such that the rotor shaft and/or the electric machine is able to be operated supercritically or such that the natural frequencies of the rotor shaft mounted in a damped manner are higher than an operating frequency of the electric machine.

The invention claimed is:

1. An arrangement for a damped bearing of a rotor shaft of an electric machine, said arrangement comprising:
   a bearing unit arranged between the rotor shaft and a housing of the electric machine;
   a damping element comprising a mesh of metal wire, said damping element being arranged in one of two ways, a first way in which the damping element is arranged between the bearing unit and the rotor shaft, a second way in which the damping element is arranged between the bearing unit and the housing;
   a converter unit connected to a stator of the electric machine;
   a computing unit connected to the converter unit;
   a sensor element; and
   a force element including at least one pin which is passed through the damping element and/or a mesh of a metal wire, with a device being provided at both axial ends of the pin for exerting a compressive force or a tensile force on the damping element and/or the mesh of the metal wire, said force element being operatively connected to the sensor element, said sensor element thereby detecting at least one of a natural frequency of at least one of the rotor shaft and the electric machine and transmitting the natural frequency to the computer unit, with the computing unit thereby determining a set value of a pre-tensioning force for the force element and to transmit the set value to the converter unit, said force element being acted upon by the converter unit in response to the set value so as to act on the damping element and thereby enable operation of the rotor shaft or the electric machine with an operating frequency which is higher than a natural frequency of the rotor shaft or electric machine mounted in a damped manner or realize that the natural frequency of the rotor shaft mounted in a damped manner is higher than the operating frequency of the electric machine,
   wherein in the event of the operation of the rotor shaft or the electric machine with the operational frequency which is higher than the natural frequency of the rotor shaft or electric machine mounted in a damped manner, the natural frequency is passed through with a change in rotational speed until the operating frequency or a standstill is reached.

2. The arrangement of claim 1, wherein the bearing unit is configured as a rolling bearing or as a plain bearing.

3. The arrangement of claim 1, wherein the damping element comprises an inner ring and an outer ring, said mesh of metal wire being arranged between the inner ring and the outer ring.

4. The arrangement of claim 3, wherein at least one of the inner and outer rings has an L-shaped cross section.

5. The arrangement of claim 3, wherein at least one of the inner and outer rings has a wedge-shaped cross section.

6. The arrangement of claim 1, wherein the damping element has a spring constant, a damping constant and a natural frequency, said damping element being maintained under tension to define a predetermined spring constant, predetermined damping constant, and predetermined natural frequency.

7. The arrangement of claim 6, further comprising:
   a sensor element; and
   a force element including at least one pin which is passed through the damping element and/or a mesh of a metal wire, with a device being provided at both axial ends of the pin for exerting a compressive force or a tensile force on the damping element and/or the mesh of the metal wire, said force element being operatively connected to the sensor element, such as to controllably maintain the damping element under tension, said sensor element thereby detecting at least one of the spring constant, damping constant and natural frequency.

8. The arrangement of claim 6, wherein the damping element is maintained in a pre-tensioned state during operation of the rotor shaft or the electric machine with the operational frequency which is higher than the natural frequency of the rotor shaft or electric machine mounted in a damped manner, such that the damping constant of the damping element is at a level thereby resulting in a continuous safe operation of the at least one of the rotor shaft and the electric machine.

9. The arrangement of claim 1, wherein the damping element is maintained under tension such that a natural frequency of the rotor shaft mounted in a damped manner is higher than an operating frequency of the electric machine.

10. The arrangement of claim 1, further comprising a shield element arranged between the rotor shaft and the housing, the bearing unit and the damping element being arranged between the rotor shaft and the shield element or between the housing and the shield element.

11. An electric machine, comprising:
    a housing;
    a rotor shaft;
    an arrangement for a damped bearing of the rotor shaft, said arrangement comprising a bearing unit arranged between the rotor shaft and the housing, and a damping element comprising a mesh of metal wire, said damping element being arranged in one of two ways, a first way in which the damping element is arranged between the bearing unit and the rotor shaft, a second way in which the damping element is arranged between the bearing unit and the housing;
    a stator, said arrangement comprising a converter unit connected to a stator of the electric machine, a computing unit connected to the converter unit, a sensor element, and a force element including at least one pin which is passed through the damping element and/or a mesh of a metal wire, with a device being provided at both axial ends of the pin for exerting a compressive force or a tensile force on the damping element and/or the mesh of the metal wire, said force element being operatively connected to the sensor element, said sensor element thereby detecting at least one of a natural frequency of at least one of the rotor shaft and/or the electric machine and transmitting the natural frequency to the computer unit, with the computing unit thereby determining a set value of a pre-tensioning force for the force element and to transmit the set value to the converter unit, said force element being acted upon by the converter unit in response to the set value so as to act on the damping element and thereby enable operation of the rotor shaft or the electric machine with an operating frequency which is higher than a natural frequency of the rotor shaft or electric machine mounted in a damped manner or realize that the natural frequency of the rotor shaft mounted in a damped manner is higher than the operating frequency of the electric machine, wherein in the event of the operation of the rotor shaft or the electric machine with the operating frequency which is higher than a natural frequency of the rotor shaft or electric machine mounted in a damped manner, the natural frequency is passed through with a change in rotational speed until the operating frequency or a standstill is reached.

12. The electric machine of claim 11, wherein the bearing unit is configured as a rolling bearing or as a plain bearing.

13. The electric machine of claim 11, wherein the damping element comprises an inner ring and an outer ring, said mesh of metal wire being arranged between the inner ring and the outer ring.

14. The electric machine of claim 13, wherein at least one of the inner and outer rings has an L-shaped cross section.

15. The electric machine of claim 13, wherein at least one of the inner and outer rings has a wedge-shaped cross section.

16. The electric machine of claim 11, wherein the damping element has a spring constant, a damping constant and a natural frequency, said damping element being maintained under tension to define a predetermined spring constant, predetermined damping constant, and predetermined natural frequency.

17. The electric machine of claim 11, wherein the sensor element detects at least one of the spring constant, damping constant and natural frequency, and the force element maintains the damping element under tension.

18. The electric machine of claim 11, wherein the damping element is maintained in a pre-tensioned state during operation of the rotor shaft or the electric machine with the operational frequency which is higher than the natural frequency of the rotor shaft or electric machine mounted in a damped manner, such that the damping constant of the damping element is at a level thereby resulting in a continuous safe operation of the at least one of the rotor shaft and the electric machine.

19. The electric machine of claim 11, wherein the damping element is maintained under tension such that a natural frequency of the rotor shaft mounted in a damped manner is higher than an operating frequency of the electric machine.

20. The electric machine of claim 11, wherein the arrangement comprises a shield element arranged between the rotor shaft and the housing, the bearing unit and the damping element being arranged between the rotor shaft and the shield element or between the housing and the shield element.

21. A method for a damped bearing of a rotor shaft of an electric machine, comprising:
  placing a bearing unit between the rotor shaft and a housing of the electric machine;
  operatively connecting a force element to a sensor element, said force element including at least one pin which is passed through a damping element and/or a mesh of a metal wire, between the bearing unit and the rotor shaft or between the bearing unit and the housing, with a device being provided at both axial ends of the pin for exerting a compressive force or a tensile force on the damping element and/or the mesh of the metal wire;
  detecting a spring constant of the damping element, a damping constant of the damping element and/or a natural frequency of the damping element by using the sensor element;
  maintaining the damping element in a pre-tensioned state by using a force element during operation of the rotor shaft or the electric machine with an operational frequency which is higher than a natural frequency of the rotor shaft or electric machine mounted in a damped manner, such that the damping constant of the damping element is at a level thereby resulting in a continuous safe operation of the at least one of the rotor shaft and the electric machine or to realize that the natural frequency of the rotor shaft mounted in a damped manner is higher than an operating frequency of the electric machine, wherein the natural frequency is determined by the sensor element;
  transmitting the natural frequency from the sensor element to a computing unit;
  determining a set value of a pre-tensioning force for the force element by the computing unit;
  transmitting the set value from the computing unit to a converter unit in operative connection with the computing unit and a stator of the electric machine;
  acting upon the force element by the converter unit in response to the set value so as to act on the damping element and thereby enable operation of the rotor shaft or the electric machine with the operational frequency which is higher than the natural frequency of the rotor shaft or electric machine mounted in a damped manner or realize that the natural frequency of the rotor shaft mounted in a damped manner is higher than an operating frequency of the electric machine; and
  in the event of the operation of the rotor shaft or the electric machine with the operational frequency which is higher than the natural frequency of the rotor shaft or electric machine mounted in a damped manner, passing through the natural frequency with a change in rotational speed until the operating frequency or a standstill is reached.

* * * * *